(12) United States Patent
Wang

(10) Patent No.: US 10,160,161 B2
(45) Date of Patent: Dec. 25, 2018

(54) APPARATUS AND PROCESSES FOR PROTECTING AN ULTRASONIC WELDING HORN USING A THIN-FILM SEPARATOR

(71) Applicant: GM Global Technology Operations LLC, Detroit, MI (US)

(72) Inventor: Pei-chung Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 362 days.

(21) Appl. No.: 14/910,920

(22) PCT Filed: Sep. 4, 2014

(86) PCT No.: PCT/CN2014/085907
§ 371 (c)(1),
(2) Date: Feb. 8, 2016

(87) PCT Pub. No.: WO2015/018377
PCT Pub. Date: Feb. 12, 2015

(65) Prior Publication Data
US 2016/0221255 A1    Aug. 4, 2016

Related U.S. Application Data

(60) Provisional application No. 61/863,462, filed on Aug. 8, 2013, provisional application No. 61/873,392, filed on Sep. 4, 2013.

(51) Int. Cl.
*B32B 37/00* (2006.01)
*B29C 65/00* (2006.01)
(Continued)

(52) U.S. Cl.
CPC ...... *B29C 66/00441* (2013.01); *B23K 20/106* (2013.01); *B23K 20/22* (2013.01);
(Continued)

(58) Field of Classification Search
CPC . B29C 65/08; B29C 66/00441; B29C 66/472; B23K 20/106; B23K 20/22
(Continued)

(56) References Cited

U.S. PATENT DOCUMENTS 4,954,206 A * 9/1990 Voss ........................ B29C 65/18
156/537
5,349,737 A    9/1994 Long
(Continued)

FOREIGN PATENT DOCUMENTS

CN    102248270 A    11/2011
JP    05-077064    3/1993

OTHER PUBLICATIONS

Written Opinion dated Nov. 14, 2014 for corresponding PCT Patent Application No. PCT/CN2014/085907.

*Primary Examiner* — James D Sells
(74) *Attorney, Agent, or Firm* — Tiffany N. Logan; Parks IP Law LLC

(57) ABSTRACT

An apparatus and processes for protecting an ultrasonic welding horn (504) during welding of polymeric composites, use a thin separator, or membrane (502) configured to transfer high-frequency acoustic vibrations while keeping the horn (504) isolated from molten workpiece material. Systems and methods for welding polymeric composites, use a conductive mechanical intermediary, reducing cycle time, compensating for any surface unevenness, and improving weld accuracy and connection strength.

20 Claims, 4 Drawing Sheets

(51) Int. Cl.
  *B23K 20/10* (2006.01)
  *B23K 20/22* (2006.01)
  *B29C 65/08* (2006.01)
  B29L 9/00 (2006.01)
  B29L 31/30 (2006.01)
(52) U.S. Cl.
  CPC ............ *B29C 65/08* (2013.01); *B29C 66/472* (2013.01); *B29L 2009/00* (2013.01); *B29L 2031/30* (2013.01)
(58) Field of Classification Search
  USPC ........................................................ 156/73.1
  See application file for complete search history.

(56) References Cited

U.S. PATENT DOCUMENTS

2002/0088525 A1\* 7/2002 Jahn ........................ B29C 65/06
  156/73.1
2005/0173493 A1 8/2005 Workman et al.

\* cited by examiner

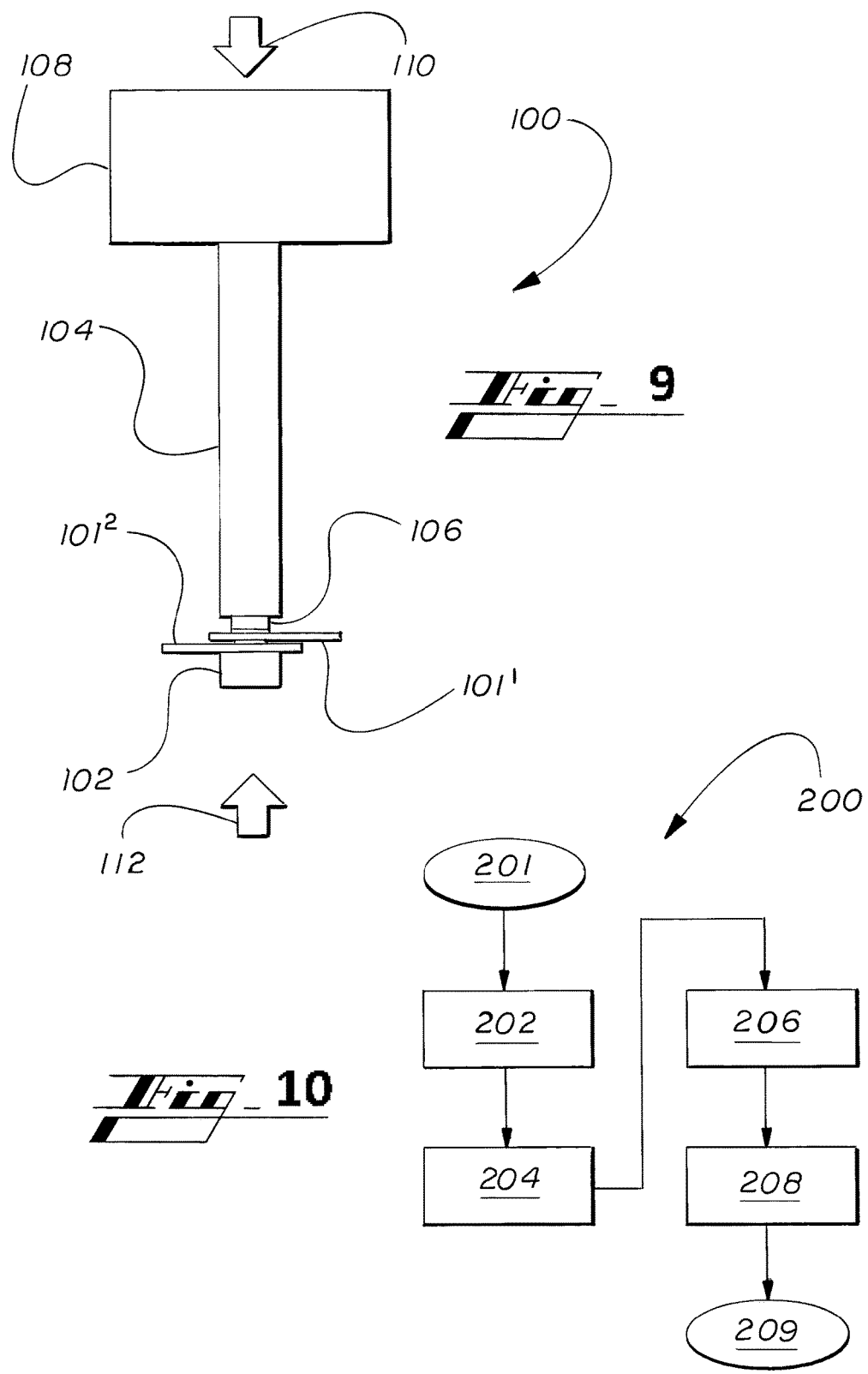

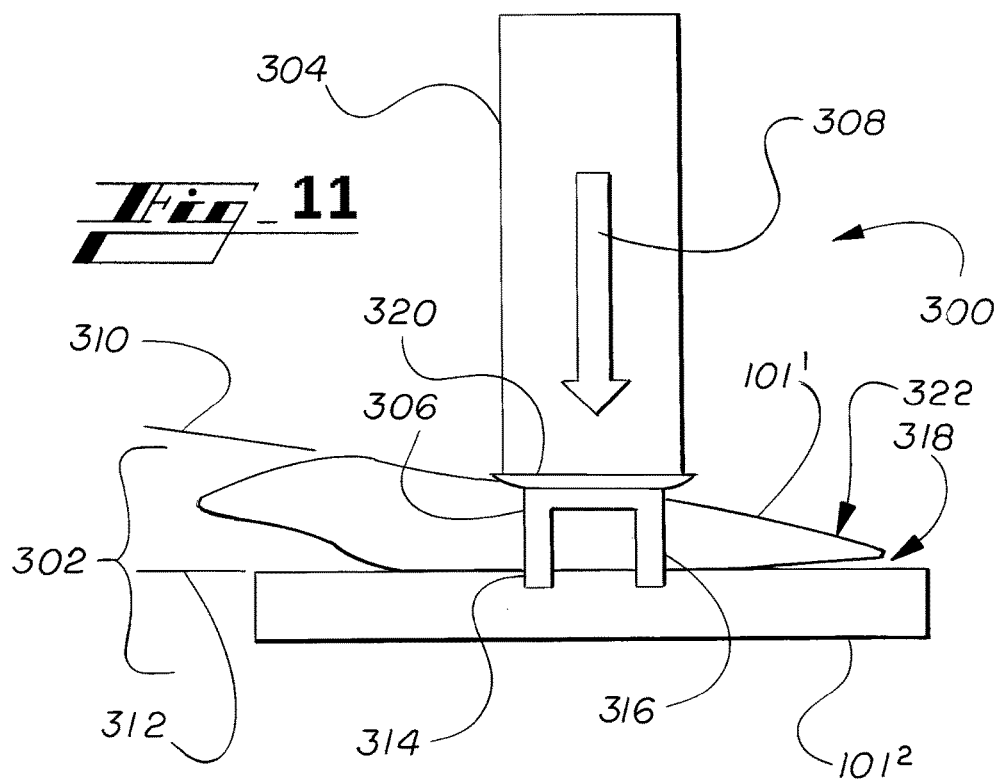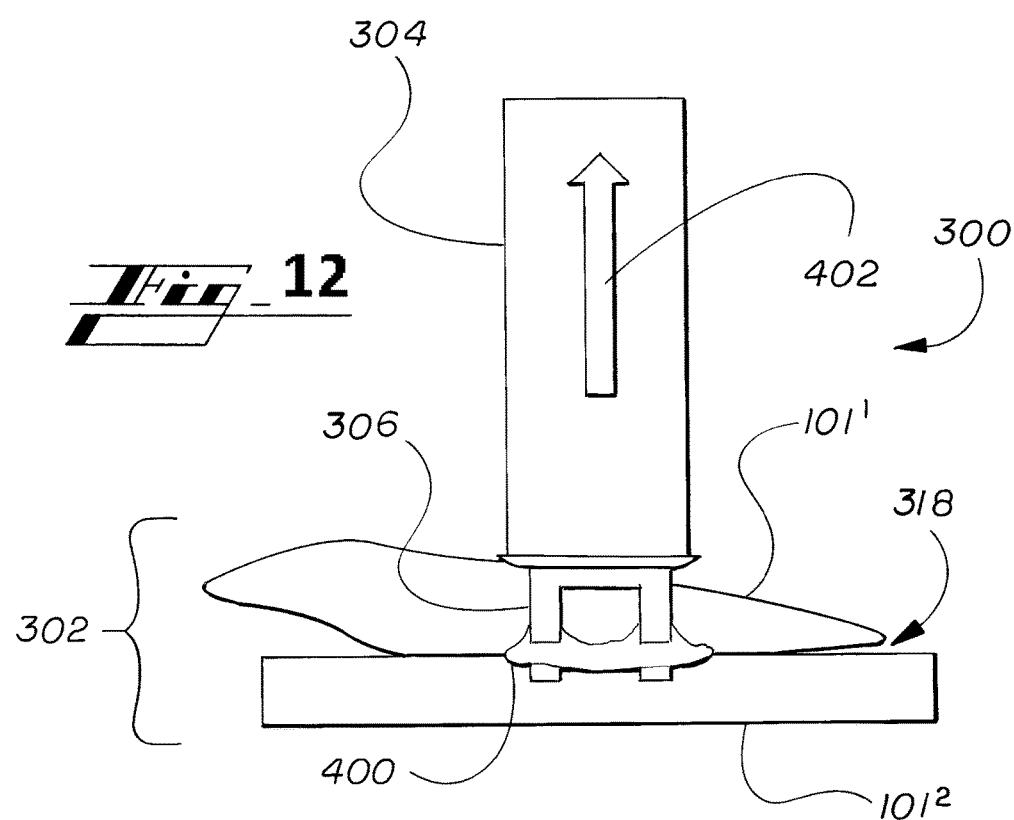

APPARATUS AND PROCESSES FOR PROTECTING AN ULTRASONIC WELDING HORN USING A THIN-FILM SEPARATOR

TECHNICAL FIELD

The present disclosure relates generally to ultrasonic welding and, more particularly, to an apparatus and processes for protecting an ultrasonic welding horn during welding of polymeric composites using a thin separator, or membrane configured to transfer high-frequency acoustic vibrations while keeping the horn isolated from molten workpiece material.

The present disclosure also relates to systems and methods for welding polymeric composites together using a conductive mechanical intermediary, to reduce cycle time, compensate for any surface unevenness, and improve weld accuracy and connection strength.

BACKGROUND

In automotive manufacturing, polymeric composites are being used increasingly due to their favorable characteristics, including being lightweight, highly-conformable or shapeable, strong, and durable. Some composites are further colorable and can be finished to have most any desired texture.

The increased use in automobiles includes, for instance, in instrument and door panels, lamps, air ducts, steering wheels, upholstery, truck beds or other vehicle storage compartments, upholstery, external parts, and even engine components. Regarding engine components, and other under-the-hood (or, UTH) applications, for instance, polymers are configured, and being developed continuously, that can withstand a hot and/or chemically aggressive environment. Regarding external parts, such as fenders, polymers are being developed that are online paintability and have high heat and chemical resistance over longer periods of time. And many other potential usages in automotive applications are being considered continuously.

With this trend, finding ways to efficiently and effectively join polymer components is becoming progressively important. Compression molding and post-mold joining techniques—e.g., ultrasonic welding—are being used more commonly.

Traditional techniques have various shortcomings. With reference to the figures, and more particularly the first figure, FIG. 1 shows schematically a conventional ultrasonic welding arrangement 100 including a welding horn 102 and two workpieces 104, 106 prior to welding.

In the illustrated step, the horn 102 is lowered to contact a top workpiece 104 of the two. Once in contact with the piece 104, an ultrasonic generator connected to the horn excites high-frequency ultrasonic vibrations, which are passed through the horn to the piece. At the interface heat is generated and the workpiece 104 begins to melt 200 as shown in FIG. 2.

FIG. 3 shows the arrangement 100 after it has been melted significantly so that now-molten material of the workpieces connects the pieces 104, 106.

The technique has shortcomings including transferring material 400 from one or both workpieces 104, 106 remaining on the horn undesirably when the horn 102 is withdrawn, as shown in FIG. 4. The remnant 400 limits horn performance going forward and horn life.

It is contemplated that the horn 102 could be held in the position of FIG. 3, in contact with the workpieces 104, 106 for a prolonged time (e.g., about 12 to 20 seconds in some implementations), allowing the new weld to cool before horn retrieval. Some material 400, though, may still transfer to the horn 102. And cycle time is lengthened undesirably, increasing the cost of production.

According to one alternative, a new horn can be used for each welding. This approach would be cost prohibitive, and the part switching, time consuming.

Another alternative is conventional mechanical fastening. The workpieces can be screwed together, or connected by nuts and bolts, for instance. These connections have shortcomings including unwanted added weight, unsightly exposed portions of the fasteners, and possibly less-robust joints.

Moreover, because some of these materials have relatively-low melting points and low electrical conductivities, there are challenges in efforts to melt the workpieces at an interface between them efficiently, quickly, and with minimal melting of other portions of the workpieces.

Energy directors are sometimes used to expedite and control welding. At least one additional challenge arises, however. Because the energy directors are usually not visible from external at the time for welding, it is difficult for the welder, attempting to focus welding at the director, to determine exactly where that is.

With or without energy directors, have an additional shortcoming of undesirably-high cycle times in addition to the undesirably-high energy requirements. Increased time is cost prohibitive, especially when multiplied by repeated iterations processing in a manufacturing environment—e.g., automobile assembly plant.

When energy directors are used, time is needed to locate the energy directors.

When energy directors are not used, more energy is required to melt a first of the workpieces to a depth reaching the second workpiece in order to join the two. Also, the resulting weld is not focused optimally because the first workpiece melts in a broader area instead of only at and around a target point as it does when a director is used. Although this process does not require locating of energy directors, it does not achieve an ideal weld.

The cycle time in both techniques is further hindered by a need to allow the workpieces to cool before withdrawing the ultrasound horn, and to withdraw the horn very slowly. These costs relate to the fact that heat dissipates slowly through polymers—and so they do not heat or cool rapidly. So, after the ultrasound horn has finished heating as needed for welding, the horn cannot be retrieved until the workpieces are sufficiently cool (e.g., about 12 to 20 seconds in some implementations), else some workpiece surface material will remain attached to the withdrawing horn, affecting the workpiece cosmetically and limiting horn performance and horn life.

Still another shortcoming of both conventional ultrasound welding techniques is that an energy-application surface of a proximate workpiece of the two must be generally flat and square to the energy applicator. A flat surface is needed to ensure sufficient contact by the horn for transmitting sufficient high-frequency (HF) vibration waves to the pieces to create the needed inter-piece heat for welding them together.

For welding via curved, or other non-flat surfaces, a special design horn is required. The resulting process is may not be as robust as desired.

An alternative to these ultrasonic welding techniques for joining polymeric composites is conventional mechanical fastening. The workpieces can be screwed together, or connected by nuts and bolts, for instance. These connections have shortcomings including unwanted added weight, unsightly exposed portions of the fasteners, and possibly less-robust joints.

SUMMARY

The present technology relates to an ultrasonic welding technique comprising protecting a welding horn, during welding of polymeric composites using a membrane, or strip material, configured to transfer high-frequency (HF) acoustic vibrations while keeping the horn isolated from molten workpiece material.

Benefits of the technique include reduced cycle time in welding with the ultrasonic weld, and increased performance and life of the horn.

Time is saved, for instance, because the horn can be retrieved rapidly—e.g., immediately when sufficient molten material is formed between the workpieces to weld them together.

Horn performance and life are enhanced by keeping the ultrasonic horn free of transfer material from the workpieces being welded together, throughout many welding performances, such as in a manufacturing environment.

The present technology also relates to systems and methods for welding composites together using a conductive mechanical intermediary, or connector. Benefits of the technique include reduced cycle time. Time is saved by channeling ultrasonic vibrations from an applicator—e.g., ultrasound horn, to the inter-piece interface by way of a slight mechanical connector to create the weld quickly, efficiently, and robustly.

Time is also saved because the horn, not contacting the workpiece directly for welding, can be retrieved rapidly—e.g., immediately post welding, without worry of any workpiece surface material remaining attached to the withdrawing horn. Earlier and quicker horn withdrawal is also allowed by the mechanical conductive component (e.g., rivet) acting as a heat sink immediately following welding, drawing heat away from the cooling weld, promoting fast or quick setting, or hardening of the new joint. Workpiece quality—e.g., cosmetics—is kept high, and horn performance and horn life going forward are improved accordingly.

The technique moreover can be used even if an energy-application surface of the proximate workpiece is curved, or otherwise not flat. Traditionally, a flat surface is preferred to ensure intimate contact by the horn for transmitting sufficient high-frequency (HF) acoustic waves to the pieces to create the needed inter-piece heat for welding them together.

Yet another benefit includes the mechanical fastening function performed by the mechanical intermediary, or connector (e.g., rivet), including after the product (e.g., automobile) is manufactured and in use. While the welds are created to be robust and stand up over time, if there is a weld weakening for any reason over the life of the product, the mechanical connector functions as a support, or backup fastener. The function can be referred to as a peel-protection, or peel-stopping, function, as the rivet may contribute to keeping the connected workpieces from peeling away from each other. The connector can be referred to as a peel stopper, for example.

Other aspects of the present invention will be in part apparent and in part pointed out hereinafter.

DESCRIPTION OF THE DRAWINGS

FIG. 9 illustrates a two-sided ultrasound system.

FIG. 10 illustrates a method for joining two workpieces, whether or not a proximate one of the pieces has a flat application surface, using a mechanical conductive connector.

FIG. 11 illustrates a workpiece arrangement following rivet piercing and before welding, according to the method shown in FIG. 10.

FIG. 12 illustrates the workpiece arrangement of FIG. 11 following rivet piercing and at least initial weld-energy application, according to the method of FIG. 10.

DETAILED DESCRIPTION

Figure 1:
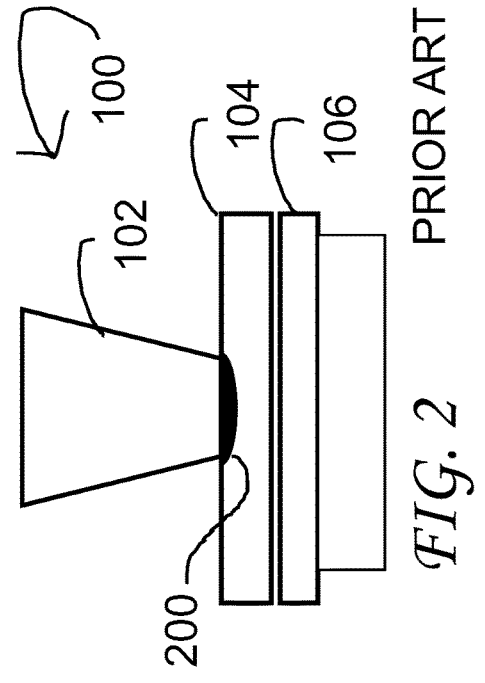
FIG. 1 illustrates schematically a conventional ultrasonic welding arrangement including a welding horn and two workpieces prior to welding them together.
Figure 2:
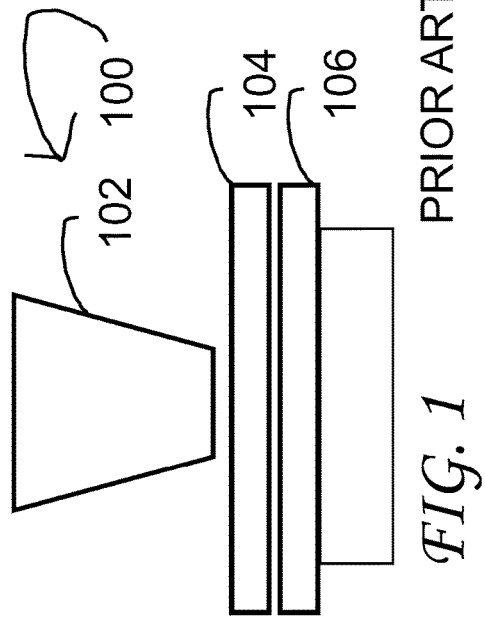
FIG. 2 shows the arrangement of FIG. 1 as welding is commenced.
Figure 3:
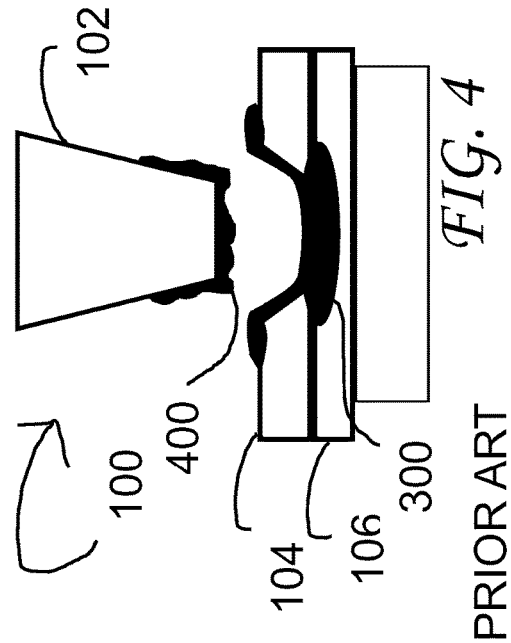
FIG. 3 shows the arrangement as welding is completed.
Figure 4:
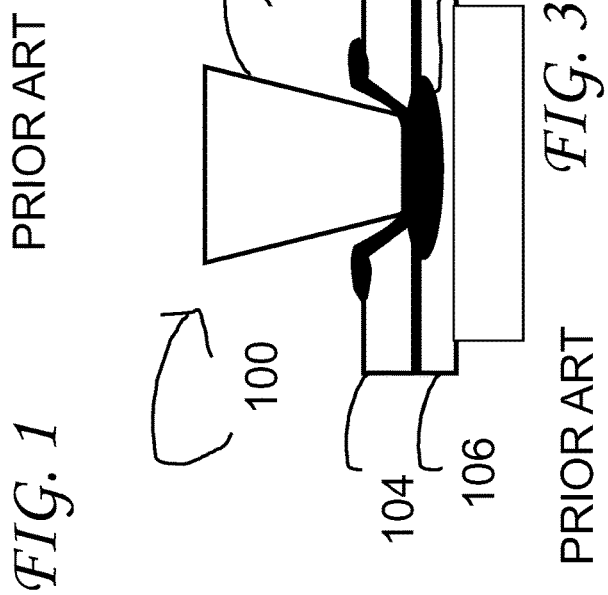
FIG. 4 shows the welding horn being retrieved post welding.

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, microprocessor-based electronics, combinations thereof, and the like. In certain embodiments, some or all operations (e.g., controlling horn application) are performed by, or at least initiated by a computing device, such as a processor executing computer-executable instructions stored or included at a computer-readable medium. And any one or more steps of the process can be performed, initiated, or otherwise facilitated by automated machinery, such as robotics.

I. GENERAL OVERVIEW OF THE DISCLOSURE

The present disclosure describes an ultrasonic welding technique for joining workpieces, such as polymeric composites.

A thin-film, strip, or membrane is configured specially for being positioned adjacent an ultrasonic application horn for performing transfer and protection functions during welding. More specifically, the membrane is configured to transfer high-frequency (HF) acoustic vibrations while keeping the horn isolated from molten workpiece material.

The system components, algorithm, and operations are described further below with reference to FIGS. 5-8.

The present disclosure also describes an ultrasonic welding technique for joining workpieces, such as polymeric composites.

The present technology further relates to systems and methods for welding polymeric composites together using a conductive mechanical intermediary, or connector. More particularly, the technique includes, prior to welding, piercing the connector—such as a staple rivet—into a first, proximate workpiece of the workpieces being joined.

Advantageously, an application surface of the proximate workpiece, into which the connector is pierced, can be curved, uneven, or not completely flat and square. Because the subsequent application of ultrasonic energy (e.g., HF vibrations) will be channeled through the connector and into the workpieces, an energy applicator—e.g., horn, does not need to contact the surface. And the connector need not sit perfectly flush with the surface. Accordingly, the surface need not be flat or to have the intimate contact with the applicator.

Another advantage of the energy application being channeled through the connector and into the workpieces is that the proximate workpiece is not damaged superficially, or cosmetically. Still another advantage is that time need not be wasted waiting for the proximate workpiece to cool before the applicator is withdrawn.

Yet another benefit of the present technique is the peel stopping function described above.

The system components, algorithm, and operations are described further below with reference to FIGS. 9-12.

II. FIRST PROCESS, SYSTEM COMPONENTS, AND WORKPIECES—FIGS. 5-8

The present technology is now described with reference to example systems, tooling, and workpieces. The figures are referenced to facilitate understanding of the technology, and not to limit scope thereof.

Reference to directions herein, such as upper, lower, up, down, and lateral, are provided to facilitate description of the present technology but does not limit scope of the technology. A description in which a horn is described as descending down upon a proximate workpiece is not limited, for example, to the horn moving vertically downward in the earth, or environment, frame. The horn in this case can be moving from left to right, for example, in the environment frame.

Figure 5:
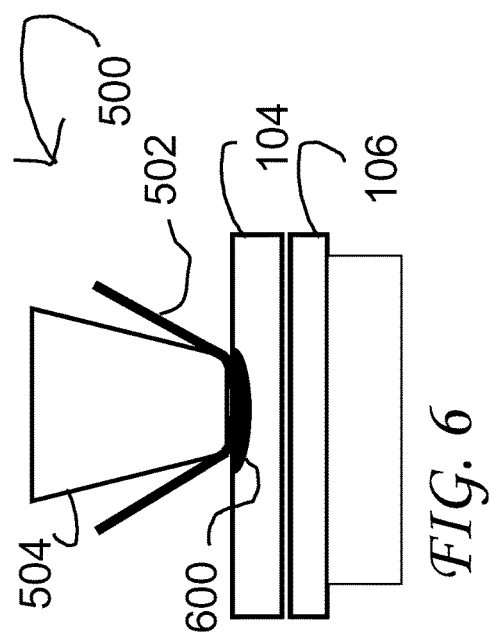
FIG. 5 illustrates schematically a novel ultrasonic welding arrangement including an ultra-thin membrane, or strip or film transition, a welding horn covered on an application side by the membrane, and the two workpieces prior to welding.

Turning again to the figures, and more particularly, the fifth figure, FIG. 5 shows schematically the new ultrasonic welding arrangement 500. The arrangement 500 includes an ultra-thin membrane, thin strip, or film separator 502. The term membrane will be used generally to refer to the element 502, and not necessarily to limit its configuration—e.g., size and shape.

The membrane 502 can include any of a variety of appropriate materials or material combinations, and can have any of a variety of appropriate shapes and sizes, for performing the described functions. In one embodiment, the membrane 502 includes titanium or aluminum.

The membrane 502 is configured to be positioned adjacent an application horn 504. The horn 504 is part of, or connected to, an ultrasound generation apparatus, not shown in detail.

As described further below, in one embodiment, the membrane 502 is part of a membrane delivery system (not shown in detail), in which fresh membrane material 502 is delivered to between the horn 504 and the workpieces 104, 106 prior to each welding.

The horn 504 of the present technology is in some embodiments similar to, or the same as, conventional welding horns.

The horn 504 can include any of a variety of appropriate materials or material combinations, and can have any of a variety of appropriate shapes and sizes, for performing the described functions. In one embodiment, the horn 504 includes titanium or aluminum.

In a contemplated embodiment, the present horn 504 is different, being specially configured, in one or more ways, to cooperate well with the membrane 502. The special configuration can include, for instance, strategic shaping, such as having rounded corners, or having connection points (not shown in detail) by which the membrane can be attached to the horn 504.

The horn 504 is shown adjacent two workpieces 104, 106 to be welded together. The workpieces 104, 106 can include similar or dissimilar materials compared to each other.

The workpieces 104, 106 can include any of various materials, and have any of a variety of shapes and sizes. In one example, the proximate workpiece 104 has a thickness (top to bottom thickness in the figures) of between about 0.5 mm and about 5 mm.

As provided, the workpieces 104, 106 being welded together can be similar or dissimilar. Regarding dissimilar workpiece materials, one workpiece can be a plastic or other polymer, for instance, and the other can be steel, aluminum, an alloy, or other metal, etc. Thus, the teachings of the present disclosure can be used to join a polymer (e.g., polymeric composite) to another polymer, or to join a polymer to a metal, for instance.

In one embodiment, the material 104, 106 includes polyethylene. In one embodiment, the material includes polyethylene terephthalate (PET), high density polyethylene (HDPE) and/or ethylene vinyl alcohol (EVOH).

In one embodiment, at least one of the workpieces 104, 106 being joined includes a polymer. At least one of the workpieces 104, 106 can include synthetic, or inorganic, molecules. While use of so-called biopolymers (or, green polymers) is increasing, petroleum based polymers are still much more common.

Material of one or both workpieces 104, 106 may also include recycled material, such as a polybutylene terephthalate (PBT) polymer, which is about eighty-five percent post-consumer polyethylene terephthalate (PET).

In one embodiment one or both of the workpieces 104, 106 includes some sort of plastic. In one embodiment, the material includes a thermo-plastic.

In one embodiment one or both of the workpieces 104, 106 includes a composite. For example, in one embodiment one or both of the workpieces includes a fiber-reinforced polymer (FRP) composite, such as a carbon-fiber-reinforced polymer (CFRP), or a glass-fiber-reinforced polymer (GFRP). The composite may be a fiberglass composite, for instance. In one embodiment, the FRP composite is a hybrid plastic-metal composite.

The material 104, 106 in some implementations includes a polyamide-grade polymer, which can be referred to generally as a polyamide.

Material of one or both workpieces 104, 106 may also include includes polyvinyl chloride (PVC).

In one embodiment, the material 104, 106 includes acrylonitrile-butadiene-styrene (ABS).

In one embodiment, the material 104, 106 includes a polycarbonate (PC).

Material 104, 106 of one or both workpieces may also comprise a type of resin. Example resins include a fiberglass polypropylene (PP) resin, a PC/PBT resin, and a PC/ABS resin.

The workpieces 104, 106 may be pre-processed, such as heated and compression molded prior to the welding.

As described further below, in operation, the horn 504 performs acoustic transfer while protecting the horn from molten workpiece material during welding. More specifically, the membrane 502 is configured to transfer high-frequency (HF) acoustic vibrations while keeping the horn isolated from molten workpiece material.

The membrane 502 can include any of a wide variety of appropriate materials without departing from the scope of the present technology. Characteristics for consideration in selecting the material can include, for instance, any one or more of the following: (i) an ability of the material to transfer the acoustic vibrations emanating from the horn 504 on to the workpieces 104, 106; and (ii) an ability of the material to keep molten workpiece material from contacting, or transferring to, the horn 504; and an appropriate level of resiliency—e.g., material strength, resiliency, flexibility, etc. to perform in at least one iteration of welding.

While in one embodiment, as mentioned above, fresh membrane material 502 is delivered to the area between the horn and the workpieces for each welding, in a contemplated embodiment, the same membrane or section of membrane 502 can be re-used at least one time. It may be considered, for instance, that although some workpiece material may become deposited on the membrane in a first welding process, the amount deposited will not hinder effective welding in a second welding, so that the material can be used more than once. It may be determined, for instance, that the same membrane, or swath of membrane, before being replaced, can be used in a certain number of weldings (e.g., two, three, five, fifteen, fifty, or numbers higher, lower, or between these). Characteristics for consideration in selecting the material can also thus include (iv) [continuing roman-numeral numbering of immediately preceding paragraph—i.e., (i), (ii), (iii)] an ability of the material to be re-used, e.g., such as numerous times on an assembly line of a manufacturing environment. The ability to be re-used can include, e.g., ability to repel or otherwise limit deposit of molten workpiece material in the membrane, and, again, as under the third variable (iii) of the previous paragraph, can include material strength, resiliency, flexibility, etc., so that the material tends not to crack, break or otherwise fail in repeated uses.

The membrane 502 has a high melting point than the workpieces 104, 106, thereby allowing it to stay solid during welding while the workpieces melt adjacent the film 502.

In one embodiment, the membrane 502 includes metal—e.g., is a thin metal foil.

The membrane 502 includes any size and shape appropriate for performing the functions described herein. While the membrane 502 may have other thicknesses 506, in one embodiment the membrane has a thickness between about 0.01 mm and about 5.0 mm. The membrane 502 may be about 0.5 mm, for instance.

The membrane 502 may be positioned adjacent the horn by personnel or automated machinery, such as robotics equipment—e.g., a robot.

In one embodiment, the membrane 502 is inserted between the horn 504 and the proximate workpiece 104 when the horn is close to the piece but before the horn contacts the workpiece. The insertion is in one embodiment performed while the horn is static temporarily, and in one embodiment while the horn is moving down toward the workpiece 104.

In one embodiment, the membrane 502 is positioned, without attaching to the horn 504, between the horn and the workpiece 104 prior to lowering the horn all the way to a top surface of the workpiece 104. In another embodiment, the horn 504 and/or the membrane 502 is configured so that the membrane 502 is attached to the horn, so that the membrane 502 is positioned between the horn and the workpiece 104, prior to lowering the horn all the way to a top surface of the workpiece 104.

In one contemplated embodiment, the horn 504 includes clips, hook-and-loop components, a reusable adhesive, snaps, or other connecting feature(s) allowing connection between the membrane 502 and the horn. In one embodiment, the membrane 502 includes any of these features. In one embodiment, both the membrane and the horn 504 include at least one of these features—e.g., the membrane and the horn including mating features (e.g., mating snaps or mating hook-and-loop elements).

In a contemplated embodiment (not shown in detail), the membrane 502 is at least somewhat rigid, and has some shaping conforming to shaping of the horn 504. The membrane would thus fit snugly around at least a portion of the horn. The snug fit can, e.g., help ensure the membrane staying in the intra-part position during the welding.

The membrane 502 can be configured to function adequately for any number of repeated uses. In one embodiment, the membrane is configured to be used once. In this case, the used membrane can be discarded, or preferably recycled, and a next membrane used for a next welding.

In another embodiment, the membrane 502 is configured to be used more than once.

As shown by arrow in FIG. 5, with the membrane 502 in place, the horn 504 is lowered toward a top surface of a first, proximate, workpiece 104 of the two workpieces being joined together.

Figure 6:
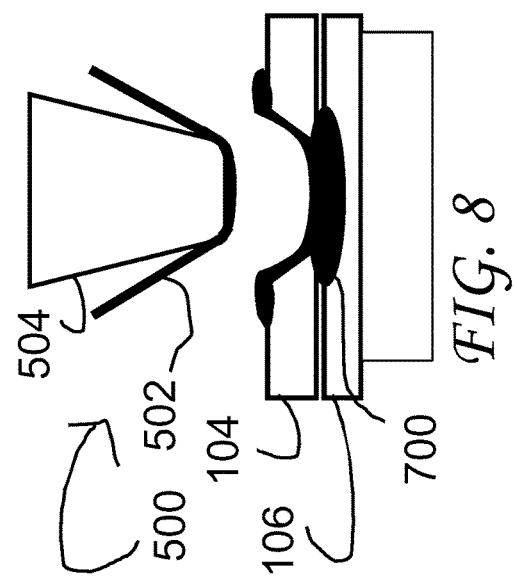
FIG. 6 shows the arrangement of FIG. 5 as welding is commenced.

FIG. 6 shows the horn 504 contacting the proximate workpiece 104 by way of the membrane 502. Once the horn/membrane combination is in contact with the proximate workpiece 104, an ultrasonic generator connected to the horn 504 excites high-frequency (HF) ultrasonic vibrations. The vibrations are passed through the horn 504 to the membrane 502 and on to the proximate workpiece 104. As the workpiece 104 receives the vibrations, the excitement generates heat in the workpiece, causing it 104 to melt, first at the membrane/workpiece interface, causing the workpiece to begin melting 600 there, as also shown in FIG. 6.

The workpieces are under some compression, at least due to the weight of the proximate workpiece 104 and downward force of the horn 504. In some embodiments, the horn 504 is configured (e.g., spring loaded, or actuated by a pneumatic or hydraulic sub-system (not shown in detail)) and/or controlled to apply a downward force on any workpiece material (e.g., proximate piece 104 and molten material) below and in contact with the horn 504 during the welding. Thus, as the workpieces melt, the horn 504 lowers.

Figure 7:
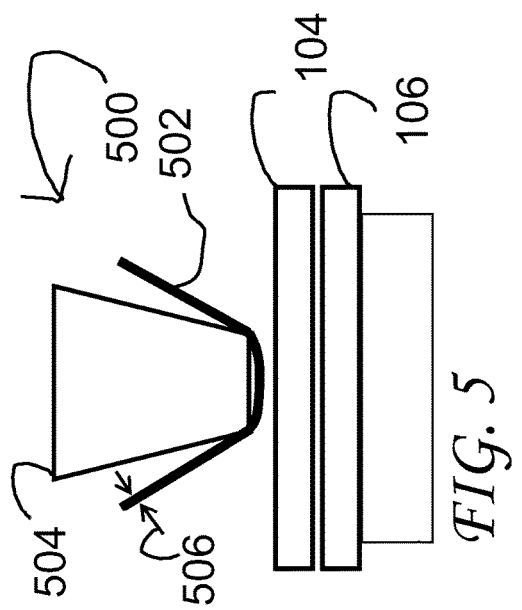
FIG. 7 shows the arrangement as welding is completed.

FIG. 7 shows the arrangement after the proximate workpiece 104, and perhaps also the distal workpiece 106, has been melted sufficiently to cause formation of molten workpiece material at an interface, or joint 700 of the workpieces 104, 106. The molten material at the joint 510 will cool to form the weld to hold the pieces 104, 106 together.

Once the workpieces 104, 106 are melted sufficiently for welding the pieces together as desired, the horn 504 can be retrieved immediately from contacting the workpieces without risk of the molten material adhering to the horn 504.

As mentioned, in one embodiment, the membrane 502 is part of a membrane delivery system (not shown in detail). As an example, the delivery system can be cassette-like, whereby a spool, reel or other reserve of the thin material 502 is positioned adjacent the horn 504. After the welding, described above, the delivery sub-system moves the used membrane 502 away from the horn and delivers fresh membrane 502 to the area between the horn 504 and next workpieces to be welded together. The delivery system may be manual and/or automated—e.g., controlled by robot, a controller, etc.

As provided, the conventional ultrasonic welding technique of FIGS. 1-4 has shortcomings including workpiece material 112 transferring from one or both workpieces 104, 106 upon retrieval of the horn immediately post welding. For this reason, in the conventional technique, either material is transferred undesirably as such, or a waiting period must be instituted before retrieval to all the workpiece to cool.

Even following a wait period, though, in conventional techniques there is still a likelihood that at least some workpiece material with transfer to the horn. Even small amounts of transfer material can accumulate over time, in repeated use, and hinder horn performance and horn life.

And the added cycle time makes the welding process much more expensive and possibly cost prohibitive when multiplied by repeated performances over time in a manufacturing environment.

According to another alternative, a new horn can be used for each welding. This approach of course is expensive and the part switching is time consuming.

III. VARIOUS FEATURES OF THE FIRST ASPECTS OF THE TECHNOLOGY (SECTIONS I AND II, ABOVE)

Many but not all of the advantage of the present technology are outlined above. Some but not all are described in this section.

Benefits include reduced cycle time and improved weld-process robustness. The benefits make welding in an assembling environment much more cost effective, and manufacturing of lightweight parts and products (e.g., vehicles) more cost effective.

Time is saved, for instance, because the horn can be retrieved rapidly—e.g., immediately when sufficient molten material is formed between the workpieces to weld them together.

Ultrasonic welding is made more robust according to the present technology at least by improving horn performance and increasing horn life, over repeated weldings.

Horn performance and life are enhanced by keeping the ultrasonic horn free of transfer material from the workpieces being welded together, throughout many welding performances, such as in a manufacturing environment.

IV. SECOND PROCESS, SYSTEM TOOLING, AND WORKPIECES—FIGS. 9-12

The present technology is now described with reference to example systems, tooling, and workpieces. The figures are referenced to facilitate understanding of the technology, and not to limit scope thereof.

Reference to directions herein, such as upper, lower, up, down, and lateral, are provided to facilitate description of the present technology but does not limit scope of the technology. A description in which a horn is described as descending down upon a proximate workpiece is not limited, for example, to the horn moving vertically downward in the earth, or environment, frame. The horn in this case can be moving from left to right, for example, in the environment frame.

IV.A. General Welding System—FIG. 9

Now turning to the figures, and more particularly, the ninth figure, FIG. 9 shows an example welding system, indicated generally by reference numeral 100. The system 100 is used to weld together two workpieces: an upper, or proximate, workpiece $101^1$ and a lower, or distal, workpiece $101^2$.

As provided, the workpieces 101 being welded together can be similar or dissimilar. Regarding dissimilar workpiece materials, one workpiece can be a plastic or other polymer, for instance, and the other can be steel, aluminum, an alloy, or other metal, etc. Thus, the teachings of the present disclosure can be used to join a polymer (e.g., polymer composite) to another polymer, or to join a polymer to a metal, for instance.

In one embodiment, the material 101 includes polyethylene. In one embodiment, the material includes polyethylene terephthalate (PET), high density polyethylene (HDPE) and/or ethylene vinyl alcohol (EVOH).

In one embodiment, at least one of the workpieces 101 being joined includes a polymer. At least one of the workpieces 101 can include synthetic, or inorganic, molecules. While use of so-called biopolymers (or, green polymers) is increasing, petroleum based polymers are still much more common.

Material of one or both workpieces 101 may also include recycled material, such as a polybutylene terephthalate (PBT) polymer, which is about eighty-five percent post-consumer polyethylene terephthalate (PET).

In one embodiment one or both of the workpieces 101 includes some sort of plastic. In one embodiment, the material includes a thermo-plastic.

In one embodiment one or both of the workpieces 101 includes a composite. For example, in one embodiment one or both of the workpieces includes a fiber-reinforced polymer (FRP) composite, such as a carbon-fiber-reinforced polymer (CFRP), or a glass-fiber-reinforced polymer (GFRP). The composite may be a fiberglass composite, for instance. In one embodiment, the FRP composite is a hybrid plastic-metal composite.

The material 101 in some implementations includes a polyamide-grade polymer, which can be referred to generally as a polyamide.

Material of one or both workpieces 101 may also include includes polyvinyl chloride (PVC).

In one embodiment, the material 101 includes acrylonitrile-butadiene-styrene (ABS).

In one embodiment, the material 101 includes a polycarbonate (PC).

Material 101 of one or both workpieces may also comprise a type of resin. Example resins include a fiberglass polypropylene (PP) resin, a PC/PBT resin, and a PC/ABS resin.

The workpieces 101 may be pre-processed, such as heated and compression molded prior to the welding.

The system 100 includes a supporting, or under, structure 102. The system also includes a welding arm 104 terminating in a welding energy application tip, or horn 106. The horn can include, for instance, an ultrasonic horn, configured to apply energy, in the form of high-frequency (HF) vibrations, to the workpieces for welding them together.

The welding arm 104 extends from a second, or application-side, structure, or mass 108.

In operation, an application-direction force 110 can be applied by and/or at the mass 108. The force 110 pushes the arm 104 and horn 106 toward the workpieces 101 being welded together. A counterpart force 112 pushes the supporting structure 102 toward the workpieces. With the application-direction force pushing toward the workpieces 101 from a first, application, direction, and the counter force 112 pushing toward the pieces 101 from an opposite direction, the workpieces 101 are kept at a desired compression during welding.

IV.B. Method of Operation—FIGS. 10-12

Figure 8:
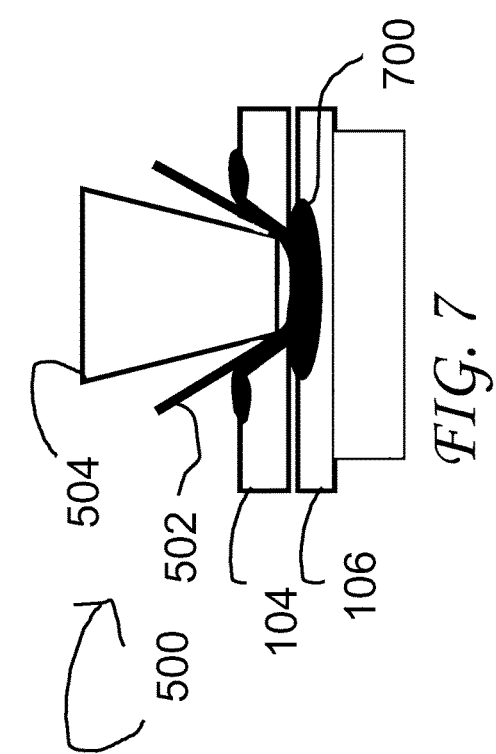
FIG. 8 shows the welding horn being retrieved without any workpiece material attached to the horn.

Turning to the eighth figure, FIG. 8 shows by way of a flow chart 200 an example method for joining two workpieces, whether or not a proximate one of the pieces has a flat application surface, using a mechanical conductive intermediary, or connector. The result is effective and efficient welding, and a more accurate and robust weld formed with less overall cycle time as compared to traditional techniques.

While joining two workpieces is described primarily herein, the number is presented as an example, and more than two pieces may be joined according to the teachings of the present disclosure.

It should be understood that the steps of the method 200 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. And it should also be understood that the illustrated method 200 can be ended at any time.

In certain embodiments, some or all steps of this process, and/or substantially equivalent steps are performed by, or at least initiated by a computing device, such as a processor executing computer-executable instructions stored or included at a computer-readable medium. And any one or more steps of the process can be performed, initiated, or otherwise facilitated by automated machinery, such as robotics.

The method 200 outlined by the flow chart of FIG. 8 is described now with additional reference to the tools and components of FIGS. 9, 11, and 12. Characteristics of the elements shown, e.g., shape, size, and number, are presented to facilitate the present description and not to limit scope of the present technology.

The method 200 begins 201 and flow proceeds to block 202, whereat a mechanical, conductive component (e.g., element 306) is provided into at least the first of the workpieces $101^1$.

An example mechanical conductive component is a rivet, such as a staple rivet. The mechanical conductive component may be inserted into the proximate workpiece in any appropriate manner.

In one embodiment, the component is positioned within the first workpiece prior to the pieces $101^1$, $101^2$ being positioned adjacent each other. This embodiment is described further below.

In another embodiment, once the workpieces are positioned adjacent each other, flow of the method 200 proceeds to step 204, whereat the mechanical, conductive component is inserted into at least one of the workpieces ($101^1$) and to extend to the conductive fluid. In one embodiment, a punching tool (e.g., element 304) is used to force the connector into at least the first of the workpieces and to extend to the conductive fluid. The punch tool can also be, include, or be a part of, the weld-energy applicator, or horn.

The piercing is in one implementation performed while welding energy (e.g., HF ultrasonic vibrations), and force, are being applied, by a welding tool, to the component. The energy causes the first workpiece $101^1$ to melt adjacent tips of the component, facilitating the piercing.

As provided, in one embodiment, the connector is positioned within the first workpiece prior to the pieces $101^1$, $101^2$ being positioned adjacent each other. The step can include, e.g., positioning the conductive mechanical connector in the first workpiece $101^1$ prior to or during a molding process for the first workpiece. The mechanical conductive component may be, for instance, implanted or embedded into the first workpiece $101^1$ during compression molding for the first workpiece $101^1$.

No matter how the mechanical conductive component is provided in the first workpiece $101^1$, the component can be further pierced into the second workpiece $101^2$—e.g., at least lower tips of the component 306 as shown in FIGS. 11 and 12. In one embodiment, the piercing is performed while welding energy (e.g., HF ultrasonic vibrations), and force (compression force), are being applied, by a welding tool (e.g., element 304), to the mechanical conductive component. The energy causes the second workpiece $101^2$ to melt adjacent tips of the connecting component, facilitating the piercing of the component into the second workpiece $101^2$.

For embodiments in which the component is punched into the workpiece(s), the system includes a punch device, which may be referred to simply as a punch, to push the mechanical conductive component into the proximate workpiece. As referenced, in one embodiment, the weld applicator—e.g., ultrasound horn functions as, includes, or is connected to the punch. In one embodiment, the punch device is separate from, or at least not the same as, the weld applicator.

With further reference to the figures, FIG. 11 shows step 202 visually. Namely, the figure shows process features 300 including the workpiece arrangement 302 after a punch 304 (e.g., horn) has pushed a mechanical conductive component 306 (e.g., rivet) into the proximate workpiece $101^1$.

To punch the mechanical conductive component 306 into the workpiece $101^1$, the punch 304 moves along a path 308. In one embodiment, the path 308 is generally orthogonal to a tangent 310 to the surface of the proximate workpiece $101^1$ or a line 312 defining an interface between the workpieces $101^1$, $101^2$ being joined.

The mechanical conductive component 306 is pre-positioned for riveting by personnel or automated machinery, such as a robotics apparatus—e.g., a pre-programmed robot. The component 306 is positioned, generally, so that legs 314, 316 of the component 306 extend into the proximate workpiece 101[1] and at least to an interface 318 between the workpieces 101[1], 101[2].

The mechanical conductive component 306 includes an application portion, or head 320. The head 320 has a generally flat application surface. In some embodiments, positioning the component 306 for being punch into place includes positioning the component so that the surface of the head 320 is generally orthogonal to the direction of path 308 of the punch 304. The surface of the head 320 may be, e.g., generally parallel to one of the tangent 310 to the surface of the proximate workpiece 101[1] and the interface line 312.

In one embodiment, it is preferred that the mechanical conductive component 306 be inserted at least to a target depth by which the legs 314, 316 of the mechanical conductive component 306 reach the interface 312 between the workpieces 101[1], 101[2]. In some implementations, as shown in FIG. 11, it is preferred that the mechanical conductive component 306 be inserted at least to a target depth by which the legs 314, 316 of the mechanical conductive component 306 extend past the interface 312 and into the second, distal workpieces 101[2], as shown in FIG. 11.

As shown in FIG. 11, an application surface 322 of the proximate workpiece 101[1] need not be flat. Along with the increased use of composites, generally, and improvements in working the same (shaping, etc.), it is expected that many new part designs—e.g., automobile designs—will be presented by which composite parts will need welding below composite application surfaces that are not flat, not even, and/or not square. The present technique is also advantageous for its ability to accommodate such scenarios.

More particularly, the head 320 of the mechanical conductive component 306 need not sit flush with the surface 322 of the proximate workpiece 101[1]. Similarly, the legs 314, 316 of the mechanical conductive component 306 need not enter the proximate workpiece 101[1] at a ninety degree angle to the surface 322.

The workpieces 101[1], 101[2] also need not have the same thicknesses, or each have a generally constant thickness. As shown in FIG. 11, the workpieces have different thicknesses, and the proximate workpiece 101[1] has a varying thickness. To accommodate each scenario, the mechanical conductive component 306 is pre-configured (or pre-selected from a variety of components 306), positioned, and inserted into the arrangement 302 so that the legs 314, 316 reach the target depth—e.g., to at least the interface 312, or past the interface 312 and into the second, distal workpieces 101[2], as shown in FIG. 11.

The mechanical conductive component 306 can have any appropriate shape and size for performing the functions described herein. The head 320 may have a circular, oval, square, or otherwise rectangular shape. In one embodiment, the head 320 has a shape corresponding (e.g., matching) a shape of a portion of the energy applicator (e.g., acoustic horn). The matching shape may help to ensure that the applicator does not contact the surface 322 of the proximate workpiece 101[1].

The legs 314, 316 can have any one or more of various features, not shown in detail in the figures, to facilitate the functions described herein, including to facilitate the embedding of the component 306 into the workpieces 101[1], 101[2]. The legs can have, e.g., one or more tapered cross-sections, have pointed tips, chamfering, etc.

In a contemplated embodiment (not shown in detail), the mechanical conductive component 306 is inserted into the part to a target depth by which the top of the head 320 does not reach to the surface 322 of the proximate workpiece 101[1]. In this case, the energy applicator, if positioned properly over the mechanical conductive component 306, can be lowered to contact the component 306 without risk of contacting the surface 322 at the same time.

Design of the head 320 of the mechanical conductive component 306—e.g., size and shape of the head 320, is thus of less importance in this case. Rivet head design can still be important for other reasons, including for facilitating proper punching of the component 306 into the arrangement 302, for desired conductivity of weld energy (e.g., HF acoustic vibrations), for after-processing appearance, and for after-processing peel stopping, which is described further below.

In one embodiment, the piercing is performed while welding energy (e.g., HF ultrasonic vibrations), and force, are being applied, by a welding tool (e.g., tool 304), to the intermediary (306). The energy causes the first workpiece 101[1] to melt adjacent tips (e.g., lower tips of 314, 316, in FIG. 11) of the intermediary, facilitating the piercing.

In another embodiment, the first step 202 includes positioning the conductive mechanical intermediary 306 in the first workpiece 101[1] prior to or during a molding process. The intermediary 306 may be, for instance, implanted or embedded into the workpiece 101[1] during compression molding.

With continued reference to the method 200 of FIG. 10, once the mechanical conductive component 306 has been positioned, flow proceeds to step 204 for welding. If the punch 304 is the welding applicator (e.g., acoustic horn), then a sub-step of removing the punch and presenting the applicator is not needed. Otherwise, the sub-step is performed.

The welding apparatus (reference, FIG. 1) excites high-frequency ultrasonic vibrations which are passed to the energy applicator (e.g, horn) and so the mechanical conductive component 306 contacting the applicator. The mechanical conductive component 306 provides a path for the vibrations, channeling them from the applicator, via the head 320 and along the legs 314, 316 through the workpiece 101[1] to the area of interface 318 between the pieces 101[1], 101[2]. The rivet 306 enhances contact between the horn and workpieces. The rivet 306 is configured (e.g., size, shape, material) to provide a medium transferring the acoustic waves (i.e., welding energy) to the interface 318 much better than the workpieces could do alone.

The vibrations reaching the interface 306 generate heat by intermocular friction of the materials (e.g., carbon-fiber composites) of the workpieces. The heat causes the workpieces to melt at the interface, creating a weld nugget initially. The nugget grows as more vibrations are received at the area and more heat generated. As the nugget grows, the generally molten material, which will soon cool, fuses the workpieces 101[1], 101[2] together.

FIG. 12 shows the process features 300 of FIG. 11 as, or after, the weld nugget, or weld, 400 is formed.

In one embodiment, not shown expressly in the figures, the process is two-sided, whereby the mechanical conducting component, or intermediary, or connector, is sized, shaped, and positioned to reach an outer surface (e.g., top surface in the figures) of the first workpiece and an opposite outer surface (e.g., bottom surface in the figures) of the second workpiece 101[2]. In this embodiment, a welding system includes a first electrode for applying welding energy (e.g., electrical current) to the connector at the first location, at or adjacent the outer surface of one of the workpieces (e.g., the first workpiece 101[1], or the second workpiece 101[2]). A second electrode 101[2] is positioned adjacent the other of the workpieces (e.g., the second workpiece $101^2$, or the first workpiece $101^1$) for receiving the current from the first electrode $101^1$.

At step 206, provision of the acoustic vibrations to the mechanical conductive component 306 is ceased. This can be done by the ultrasound system stopping exciting the vibrations or otherwise ceasing the provision of the vibrations to the applicator (e.g., horn).

At step 208, the energy applicator is withdrawn from the mechanical conductive component 306. A path of withdrawal is indicated generally by reference numeral 402 in FIG. 12.

As provided, in stage 204, the mechanical conductive component 306 creates an enhanced connection between the applicator and the workpieces, for enhanced welding characteristics. In stages 206 and 208, the mechanical conductive component 306 further acts as a heat sink, drawing heat from the cooling weld, promoting fast setting, or hardening of the new joint.

The connection between the weld applicator and mechanical conductive component (e.g., horn and rivet), and the post-welding heat sink function of the mechanical conductive component, allow early and relatively-rapid withdrawal of the applicator from adjacent the workpieces. The resulting cycle time of the present technology is, in one embodiment, as low as a few seconds, compared to previous methods requiring about 15 seconds or more.

As provided, in conventional techniques, direct horn-to-workpiece contact was needed, and so a relatively-long waiting period to allow the workpiece-horn interface to cool sufficiently, else workpiece material would be left deposited on the horn undesirably.

In addition to the time-saving aspects of the early and quick horn retrieval, obviating direct horn-to-workpiece connection also, thus, ensures high workpiece quality—e.g., cosmetics. Also, horn performance and horn life going forward are improved accordingly by workpiece material not contacting or being left on the horn.

The method 200 of FIG. 10 can be ended, or repeated, as indicated by oval 209—e.g., in connection with another weld point of the workpiece arrangement or another set of workpieces.

V. VARIOUS FEATURES OF THE FIRST ASPECTS OF THE TECHNOLOGY (SECTIONS I AND IV, ABOVE)

Many but not all of the advantage of the present technology are outlined above. Some but not all are described in this section.

Benefits include reduced cycle time and energy requirement. Time is saved by channeling ultrasonic vibrations from an applicator—e.g., ultrasound horn, to the inter-piece interface by way of a slight mechanical intermediary, or connector to create the weld quickly, efficiently, and robustly.

Time is also saved by the allowance of rapid horn retrieval. The horn, not contacting the workpiece directly for welding, can be retrieved immediately post welding, without worry of any workpiece surface material remaining attached to the withdrawing horn. High workpiece quality—e.g., cosmetics—is maintained, and horn performance and horn life going forward are improved accordingly.

Advantageously, an application surface of the proximate workpiece, into which the connector is pierced, can be curved, uneven, or not completely flat and square. Because the subsequent application of ultrasonic energy (e.g., HF vibrations) will be channeled through the connector and into the workpieces, an energy applicator—e.g., horn, does not need to contact the surface. Accordingly, the surface need not be flat and square to the applicator, so long as the connector is embedded to a target depth into the workpieces.

Yet another benefit of the present technique is the peel stopping function described above. More particularly, the mechanical connector (e.g., rivet) performs a mechanical fastening function, including after the product (e.g., automobile) is manufactured and in use. While the welds are created to be robust and stand up over time, if there is a weld weakening for any reason over the life of the product, the mechanical connector functions as a support, or backup fastener. The function can be referred to as a peel-protection, or peel-stopping, function, as the rivet contributes to keeping the connected workpieces connected.

VI. CONCLUSION

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed:

1. A method, for welding together multiple workpieces using a protected welding horn, comprising:
   positioning a thin membrane comprising metal, the membrane being adjacent the welding horn;
   positioning the welding horn adjacent a proximate workpiece of the multiple workpieces;
   applying, in a welding operation, welding energy via the welding horn to the proximate workpiece; and
   separating, after the welding operation, the welding horn and the workpieces without any molten material of the workpieces having been deposited on the horn;
   wherein:
   the membrane is positioned at all points between the welding horn and the proximate workpiece during the welding operation; and
   the membrane separates the welding horn from molten workpiece material during the welding operation, ensuring that no molten workpiece material touches the welding horn.

2. The method of claim 1, wherein the welding horn is connected to an ultrasound generation apparatus.

3. The method of claim 1, further comprising attaching the membrane to the welding horn.

4. The method of claim 1, wherein:
the welding energy includes high-frequency (HF) acoustic vibrations; and
the membrane is configured to transfer the vibrations efficiently from the welding horn to the workpieces.

5. The method of claim 1, wherein the membrane has a melting point that is higher than a melting point of the proximate workpiece.

6. The method of claim 1, wherein the membrane is configured to be reused in multiple positioning and welding operations.

7. The method of claim 1, wherein the membrane includes titanium or aluminium.

8. The method of claim 1, wherein at least one operation of the process is performed by automated machinery.

9. The method of claim 1, wherein the proximate workpiece and a distal workpiece have identical material.

10. The method of claim 1, wherein the proximate workpiece and a distal workpiece have dissimilar material.

11. The method of claim 1, wherein positioning the thin membrane adjacent the welding horn includes delivering fresh membrane material from a reserve adjacent the horn while previously-used membrane material is moved away from the welding horn.

12. The method of claim 11, wherein positioning the membrane is performed using a cassette-like delivery system wherein the reserve material is stored initially on a nearby spool.

13. The method of claim 1, wherein the proximate workpiece has a thickness between about 0.5 mm and about 5 mm.

14. The method of claim 1, wherein the membrane has a thickness between about 0.01 mm and about 0.5 mm.

15. The method of claim 1, wherein the separating is performed immediately after the welding operation.

16. A welding assembly, for welding together multiple workpieces while protecting a protected welding horn, comprising:
the welding horn; and
a thin membrane comprising metal, the membrane being adjacent the welding horn;
wherein:
the welding horn is custom configured to be attached to the thin membrane;
the thin membrane is attached to the welding horn so that the membrane separates the welding horn from the workpieces to be welded together, thereby separating the welding horn from molten workpiece material.

17. The welding assembly of claim 16, wherein the membrane has at least one characteristic selected from a group consisting of:
the membrane has a melting point that is higher than a melting point of a proximate workpiece;
the membrane is configured to be reused in multiple positioning and welding operations; and
the membrane includes titanium or aluminium.

18. The welding assembly of claim 16, further comprising a membrane delivery system whereby positioning the thin membrane adjacent the welding horn includes delivering fresh membrane material from a reserve in the delivery system adjacent the horn while previously-used membrane material is moved away from the welding horn.

19. The welding assembly of claim 16, wherein:
a proximate workpiece has a thickness between about 0.5 mm and about 5 mm; and/or
the membrane has a thickness between about 0.01 mm and about 0.5 mm.

20. A method, for welding together multiple workpieces using a protected welding horn, comprising:
positioning a thin membrane comprising metal, the membrane being adjacent the welding horn;
positioning the welding horn adjacent a proximate workpiece of the multiple workpieces with the membrane between the horn and proximate workpiece;
applying, in a welding operation, welding energy via the welding horn to the proximate workpiece; and
separating, after the welding operation, the welding horn and the workpieces without any molten material of the workpieces having been deposited on the horn by operation of the membrane.

* * * * *